United States Patent
Reese et al.

(10) Patent No.: US 8,455,101 B2
(45) Date of Patent: Jun. 4, 2013

(54) POLYURETHANE LAMINATION RESIN, LAMINATE CONTAINING THE POLYURETHANE LAMINATION RESIN, AND SKIS OR SNOWBOARDS CONTAINING THE LAMINATE

(75) Inventors: Hans-Juergen Reese, Damme (DE); Bert Neuhaus, Diepholz (DE); Silvio Holl, Huede (DE); Guenter Taenny, Guntersblum (DE)

(73) Assignee: BASF SE, Ludwigshafen (DE)

( * ) Notice: Subject to any disclaimer, the term of this patent is extended or adjusted under 35 U.S.C. 154(b) by 361 days.

(21) Appl. No.: 12/738,557

(22) PCT Filed: Oct. 22, 2008

(86) PCT No.: PCT/EP2008/064293
§ 371 (c)(1),
(2), (4) Date: Apr. 16, 2010

(87) PCT Pub. No.: WO2009/053394
PCT Pub. Date: Apr. 30, 2009

(65) Prior Publication Data
US 2010/0255316 A1    Oct. 7, 2010

(30) Foreign Application Priority Data
Oct. 26, 2007  (EP) .................................. 07119420

(51) Int. Cl.
B32B 27/40    (2006.01)
C08G 18/72    (2006.01)
C08G 18/10    (2006.01)

(52) U.S. Cl.
USPC ...... 428/423.1; 528/67; 521/159; 252/182.22

(58) Field of Classification Search
USPC ...... 428/423.1; 528/67; 521/159; 252/182.22
See application file for complete search history.

(56) References Cited

U.S. PATENT DOCUMENTS

| 3,769,244 A | * | 10/1973 | Hashimoto et al. | 521/129 |
| 5,071,613 A | * | 12/1991 | Fukami et al. | 264/257 |
| 5,278,274 A | * | 1/1994 | Verhelst et al. | 528/44 |
| 5,494,941 A | * | 2/1996 | Lutter et al. | 521/159 |
| 5,698,609 A | * | 12/1997 | Lockwood et al. | 521/173 |
| 2005/0222290 A1 | | 10/2005 | Tokushige | |
| 2005/0244653 A1 | | 11/2005 | Peeler et al. | |
| 2007/0098997 A1 | | 5/2007 | Younes et al. | |
| 2008/0020194 A1 | | 1/2008 | Younes et al. | |

FOREIGN PATENT DOCUMENTS

| JP | 04135578 | 5/1992 |
| JP | 2001 302814 | 10/2001 |
| JP | 2002 3814 | 1/2002 |

OTHER PUBLICATIONS

International Search Report issued Feb. 16, 2009 in PCT/EP08/064293 filed Oct. 22, 2008.

* cited by examiner

*Primary Examiner* — Thao T. Tran
(74) *Attorney, Agent, or Firm* — Oblon, Spivak, McClelland, Maier & Neustadt, L.L.P.

(57) ABSTRACT

The present invention relates to a process for producing a polyurethane lamination resin, by mixing a) an isocyanate prepolymer based on diphenylmethane diisocyanate having a difunctionally started polyether, b) polyphenylene polymethylene polyisocyanate, c) trifunctionally started polyetherpolyol with an average molar mass of from 350 to 600 g/mol, d) a thermoactivatable capped catalyst, e) if appropriate, chain extender and/or crosslinking agent, f) if appropriate, water-absorbent substances, and g) if appropriate, other additives to give the polyurethane lamination resin. The present invention further relates to a polyurethane lamination resin, obtainable via a process of this type, and to the use of this type of polyurethane lamination resin for producing laminates, and also to skis or snowboards, comprising this type of laminate.

21 Claims, No Drawings

POLYURETHANE LAMINATION RESIN, LAMINATE CONTAINING THE POLYURETHANE LAMINATION RESIN, AND SKIS OR SNOWBOARDS CONTAINING THE LAMINATE

CROSS REFERENCE TO RELATED APPLICATION

This application is a 371 of PCT/EP08/064,293, filed on Oct. 22, 2008, and claims priority to European Patent Application No. 07119420.3, filed on Oct. 26, 2007.

The present invention relates to a process for producing a polyurethane lamination resin, by mixing a) an isocyanate prepolymer based on diphenylmethane diisocyanate having a difunctionally started polyether, b) polyphenylene polymethylene polyisocyanate, c) trifunctionally started polyether polyol with an average molar mass of from 350 to 600 g/mol, d) a thermoactivatable capped catalyst, e) if appropriate, chain extender and/or crosslinking agent, f) if appropriate, water-absorbent substances, and g) if appropriate, other additives to give the polyurethane lamination resin. The present invention further relates to a polyurethane lamination resin, obtainable via a process of this type, and to the use of this type of polyurethane lamination resin for producing laminates, and also to skis or snowboards, comprising this type of laminate.

Lamination resins based on polyurethanes are known. By way of example, JP 2002/003814 discloses a two-component lamination adhesive obtained via reaction of a polyol component, comprising polyether polyol, titanium dioxide and, as solvent, ethyl acetate, with an isocyanate component which comprises polyisocyanate dissolved in ethyl acetate. A disadvantage of the lamination resin according to JP 2002/003814 is its content of solvent, and this includes the resultant processing disadvantages and environmental pollution. JP 2001/302814 describes a two-component polyurethane lamination resin for the lamination of timber blocks; it is obtained via mixing polyether polyol mixtures, comprising propoxylated ethylenediamine, propoxylated bisphenol, and ethoxylated trimethylolpropane, and also the low-viscosity plasticizer dioctyl adipate, with a polyaryl polyisocyanate (PAPI). A disadvantage of a lamination resin according to JP 2001/302814 is the plasticizer content thereof intended to reduce viscosity, and the use of amine polyether polyol, which exerts an unfavorable effect on viscosity behavior in the processing phase of lamination.

US 2005/0244653 describes a two-layer plastics laminate composed of a decorative layer made of styrene-cured unsaturated polyester, and a reverse layer, which is made of a polyurethane resin, and which can comprise glassfiber mats as reinforcing agent. The polyurethane resin is obtained by reacting the polyol component, which in essence comprises sugar polyols, with an isocyanate component composed of polyphenylene polymethylene polyisocyanate and of modified MDI, in the presence of two aminic catalysts, where one is thermoactivatable. In contrast to the Japanese patent specifications, the resin according to US 2005/0244653 is free from solvents and diluents, but the high viscosity thereof immediately after the mixing process and the resultant poor wettability of the reinforcing agents are decisive disadvantages, as also are the inadequate hardening behavior of the resin during lamination, and the poor mechanical properties of the resultant laminate.

US 2007098997 discloses a barrier coating made of an isocyanate semiprepolymer derived from diphenylmethane diisocyanate and polypropylene glycol, polymeric MDI, trifunctionally started polyetherol, and also a non-thermally-activatable catalyst. Said barrier coating is applied to a polyurethane-glassfiber laminate.

Stringent requirements are placed upon the laminate in particular for producing skis or snowboards. By way of example, hardness has to be high in order that the laminate can stabilize the ski that has been produced. Further requirements are high strength, and also relatively high stiffness, high tensile strength, and a high flexural modulus of elasticity, without embrittlement, particularly at low temperatures. The desired lamination resin should moreover have a long pot life and low viscosity, so that the reaction mixture penetrates the fibers in an ideal manner during production of the laminate, these therefore being wetted by the lamination resin. The subsequent hardening should, however, proceed at maximum rate in order to provide maximum production rate of the laminate, with resultant cost reduction.

It was therefore an object of the present invention to provide a lamination resin which remains processable for a long time and has low viscosity after the mixing process, and also hardens rapidly once the reaction has begun. Another object of the invention was to provide a hard laminate with low-temperature flexibility and with high strength, and also relatively high stiffness, and with a high tensile strength, and a high flexural modulus of elasticity, with no embrittlement, especially at low temperatures.

The object of the invention is achieved via a polyurethane lamination resin obtainable by mixing a) an isocyanate prepolymer based on diphenylmethane diisocyanate having a difunctionally started polyether, b) polyphenylene polymethylene polyisocyanate, c) trifunctionally started polyether polyol with an average molar mass of from 350 to 600 g/mol, d) thermoactivatable capped catalyst, e) if appropriate, chain extender and/or crosslinking agent, f) if appropriate, water-absorbent substances, and g) if appropriate, other additives to give the polyurethane lamination resin.

For the purposes of the present invention, a lamination resin is a resin suitable for producing laminates. To this end, the general method saturates reinforcement media, for example based on fibers or fiber mats, with the liquid lamination resin, and hardens the lamination resin. The viscosity at room temperature one minute after production of the resin is preferably smaller than 1000 mPas, particularly preferably smaller than 500 mPas.

The isocyanate prepolymer a) made of monomeric diphenylmethane diisocyanate and polypropylene glycol is obtainable by reacting monomeric diphenylmethane diisocyanate, preferably diphenylmethane 4,4'-diisocyanate with polypropylene glycol, for example at temperatures of from 30 to 100° C., preferably at about 80° C., to give the prepolymer. It is preferable here to use polypropylene glycol which is obtainable by way of example via KOH catalysis or DMC catalysis, with a molar mass of from 350 to 600 g/mol. The starter substance used here preferably comprises propylene glycol or water. The isocyanate content of the prepolymer here is preferably from 19 to 31% by weight of NCO.

The polyphenylene polymethylene polyisocyanate b) used preferably comprises polyphenylene polymethylene polyisocyanate (also termed PMDI) with a viscosity at 25° C. smaller than 600 mPas, preferably from 100 to 400 mPas, and in particular from 150 to 300 mPas. A PMDI of the invention preferably comprises from 36 to 50% by weight of 2-ring compounds (methylenediphenylene diisocyanate), from 20 to 28% by weight of 3-ring compounds, from 6 to 14% by weight of 4-ring compounds, from 2 to 8% by weight of 5-ring compounds, and from 12 to 28% by weight of compounds having 6 or more rings.

The ratio of isocyanate prepolymer a) and polyphenylene polymethylene polyisocyanate b) is preferably from 0.9:1 to 1.5:1, with preference from 1.05:1 to 1.35:1, based in each case on the weight of components a) and b).

The trifunctionally started polyetherol c) with a number-average molar mass of from 350 to 600 g/mol used for polyurethane production can comprise known polyetherols. The polyetherols are obtained by known processes, for example via anionic polymerization of alkylene oxides with addition of at least one starter molecule comprising 3 reactive hydrogen atoms, in the presence of catalysts. Catalysts used can comprise alkali metal hydroxides, such as sodium hydroxide or potassium hydroxide, or alkali metal alcoholates, such as sodium methoxide, sodium ethoxide, or potassium ethoxide, or potassium isopropoxide, or, in the case of cationic polymerization, Lewis acids, such as antimony pentachloride, boron trifluoride etherate, or bleaching earth. Double metal cyanide compounds can also be used as catalysts, these being known as DMC catalysts.

The alkylene oxides used preferably comprise one or more compounds having from 2 to 4 carbon atoms in the alkylene radical, examples being tetrahydrofuran, propylene 1,3-oxide, and butylene 1.2- or 2,3-oxide, in each case alone or in the form of a mixture, and preferably ethylene oxide and/or propylene 1,2-oxide. It is particularly preferable that trifunctionally started polyetherols of the invention comprise secondary OH groups. These are obtained by way of example via terminal propylene oxide groups. In particular, the alkylene oxide used comprises exclusively propylene 1,2-oxide.

Examples of starter molecules that can be used are glycerol, trimethylolpropane, ethanolamine, diethanolamine, triethanolamine, and also other trihydric alcohols or amines having three active hydrogen atoms.

The thermoreactive, capped catalyst d) used can comprise any catalyst which has low activity at room temperature and becomes more active at elevated temperatures, preferably at temperatures greater than 50° C., particularly preferably greater than 80° C., and in particular greater than 100° C. No further catalysts are used here alongside the thermoreactive catalyst. The capped catalysts used preferably comprise those capped by substances which function as proton donors with respect to the catalyst. Examples here in the case of the amine catalysts are bis-2-dimethylaminoethyl ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, trisdimethylaminopropyl-hexahydrotriazine, dimethylaminopropylamine, N-ethylmorpholine, diazabicycloundecene, and diazabicyclonones, and also mixtures thereof, preference being given here to cyclic and in particular bicyclic amine catalysts. The proton donors used preferably comprise carboxylic acids or phenols and aromatic alcohols. It is particularly preferable to use aromatic alcohols as proton donors. The molar ratio of groups acting as proton donor within the proton donor to protonatable amine groups in the amine catalyst is preferably from 0.9:1 to 1.1:1, in particular 1:1. The capped amine catalyst used here particularly preferably comprises phenol-capped 1,8-diazabicyclo[5.4.0]undec-7-ene.

The proportion of the thermoreactive, capped catalyst d) here is preferably from 0.05 to 10% by weight, particularly preferably from 0.1 to 5% by weight, and in particular from 0.5 to 2% by weight, based on the total weight of components c) to g).

The chain extender and/or crosslinking agent e) used can comprise a compound having groups reactive toward isocyanates and having a molar mass smaller than 300 g/mol. Examples of chain extenders and/or crosslinking agents that can be used are di- or trifunctional amines and alcohols, in particular diols, triols, or both, in each case with molecular weights smaller than 300, preferably from 60 to 150, where chain extenders have 2 hydrogen atoms reactive toward isocyanates and crosslinking agents have 3 hydrogen atoms reactive toward isocyanate. Examples of those that can be used are aliphatic, cycloaliphatic and/or araliphatic diols having from 2 to 14, preferably from 2 to 10, carbon atoms, e.g. ethylene glycol, 1,3-propanediol, 1,10-decanediol, 1,2-, 1,3-, and 1,4-dihydroxycyclohexane, diethylene glycol, dipropylene glycol, and preferably 1,4-butanediol, 1,6-hexanediol, and bis(2-hydroxyethyl)hydroquinone, triols, such as 1,2,4- and 1,3,5-trihydroxycyclohexane, glycerol, and trimethylolpropane, and low-molecular-weight polyalkylene oxides which contain hydroxy groups and are based on ethylene oxide and/or on propylene 1,2-oxide and on the abovementioned diols and/or triols, as starter molecules. It is particularly preferable that the chain extender and/or crosslinking agent e) used comprises glycerol.

If use is made of chain extenders, crosslinking agents, or a mixture thereof, the amounts advantageously used of these are from 0.1 to 40% by weight, preferably from 0.5 to 10% by weight, and in particular from 1.0 to 5% by weight, based on the weight of components c), d), and e).

Additives used for water absorption f) preferably comprise aluminosilicates, selected from the group of the sodium aluminosilicates, potassium aluminosilicates, calcium aluminosilicates, cesium aluminosilicates, barium aluminosilicates, magnesium aluminosilicates, strontium aluminosilicates, sodium aluminophosphates, potassium aluminophosphates, calcium aluminophosphates, and mixtures thereof. It is particularly preferable to use mixtures of sodium aluminosilicates, potassium aluminosilicates, and calcium aluminosilicates in castor oil as carrier substance.

The number-average particle size of the additive used for water absorption f) is preferably not greater than 200 μm, particularly preferably not greater than 150 μm, and in particular not greater than 100 μm. The pore width of the additive of the invention is preferably from 2 to 5 Ångstrom.

If an additive for water absorption f) is added, the amounts added are preferably greater than one part by weight, particularly preferably in the range from 0.5 to 5 parts by weight, based on the total weight of components c), d), and f), and also, if appropriate, e) and g).

Other additives g) that can be used are any of the additives known in polyurethane chemistry. It is preferable to use additives g) which do not greatly increase the viscosity of the reaction mixture. By way of example, it is possible to use liquid additives, such as antifoams, deaerators, UV stabilizers, or heat stabilizers. These additives are known and are described by way of example in "Kunststoffhandbuch [Plastics handbook], volume 7, Polyurethane [polyurethanes]", Carl Hanser Verlag, $3^{rd}$ edition, 1993, chapter 3.4.

To produce the polyurethane lamination resin of the invention, the components a) to d) and, if appropriate, e), f), and g) described above are preferably mixed with one another in quantitative proportions such that the isocyanate index is in the range from 85 to 145, particularly preferably in the range from 105 to 125. For the purposes of the present invention, isocyanate index here means the stoichiometric ratio of isocyanate groups to groups reactive with isocyanate, multiplied by 100. Groups reactive with isocyanate here means any of the groups that are present in the reaction mixture and that are reactive with isocyanate, inclusive of chemical blowing agents, but not the isocyanate group itself.

It is preferable here to use the two-component process. For this, components c) and d), and also, if appropriate, e), f) and g) are mixed to give a polyol component A), and components a) and b) are mixed to give an isocyanate component B). To produce the polyurethane lamination resin of the invention, polyol component A) and isocyanate component B) are then mixed.

For the production of laminates, the polyurethane lamination resin of the invention is applied to a reinforcing agent. The reinforcing agents used can comprise any of the materials which provide a further increase in mechanical stability to the polyurethane lamination resin of the invention. Examples of these reinforcing agents are glass fibers, glassfiber mats, and carbon fiber mats, preference being given to glassfiber mats. The temperature of the resin here is in the range from 25 to 35° C.

The polyurethane lamination resin of the invention is particularly suitable for producing skis and snowboards. Skis can be manufactured here as follows. The polyurethane lamination resin of the invention can be obtained by mixing polyol component A) and isocyanate component B), preferably in the high-pressure process, and the resin can be applied to the upper web of the interior of the ski, which is preferably composed of a glassfiber mat. The saturated upper web can then be introduced into a closed mold. The mold temperature here is preferably from 60 to 90° C. The reaction of an IRF system (integral rigid foam) is then introduced into said closed mold and hardened together with the lamination-resin-saturated upper web. By using the polyurethane lamination resin of the invention it is possible here for the curing of the polyurethane lamination resin and the curing of the rigid polyurethane foam to proceed in parallel. This gives a ski with improved service properties in the form of better mechanical properties, such as stiffness and flexural modulus of elasticity. This is particularly advantageous for relatively high-specification skis, for example in the professional sector.

The manufacture of snowboards using the polyurethane lamination resin of the invention can, for example, take place as follows. For the manufacture of snowboards, the polyurethane lamination resin of the invention can be obtained by mixing polyol component A) and isocyanate component B), preferably in the low-pressure process, and the resin can be applied to the constituents of the snowboard, mostly a lower web, wooden core, glassfiber mat, and an upper web. The lower and upper web used in snowboards preferably comprises a combination of glass mat and polyethylene-web-running surface. The resultant lamination-resin-saturated constituents of the snowboard are then combined in the shape of the snowboard and then pressed in the closed mold.

The polyurethane lamination resin of the invention features excellent processability, in particular because of its low viscosity and the fact that it remains processable for a long time. It is therefore possible to achieve ideal wetting of reinforcing agents with the polyurethane lamination resin. Furthermore, the resin initially reacts slowly but completes its reaction rapidly once the reaction has begun. Another factor is that the laminates of the invention have excellent mechanical properties. By way of example, they exhibit excellent strength, and also increased stiffness, and a high flexural modulus of elasticity with no embrittlement, particularly at low temperatures.

Examples will be used below for further explanation of the invention.

INVENTIVE EXAMPLE 1

Manufacture of Polyol Component A

A polyol component was produced from 92 kg of a polyethertriol based on glycerol/propylene oxide with molar mass 420 g/mol, 2 kg of glycerol, 5 kg of a sodium aluminosilicate having zeolite structure, 50% strength in castor oil, and also 1 kg of phenol-capped 1,8-diazabicyclo[5,4,0]-7-undecene (DBU).

The viscosity of the resultant polyol component is 460 mPas at 25° C.

Manufacture of Isocyanate Component B

A semiprepolymer was produced from 42.1 kg of diphenylmethane 4,4'-diisocyanate and 8.3 kg of a polypropylene glycol having molar mass 450 g/mol, by reaction at about 80° C. Once the prepolymer reaction has proceeded, 49.6 kg of a polyphenylene polymethylene polyisocyanate (trademark: Lupranat® M 20 W from Elastogran) were admixed with the reaction product.

The viscosity of the resultant isocyanate component is 170 mPas at 25° C.

Processing to Give the Lamination Resin:

The components described above are processed in a machine in an A:B mixing ratio of 100:115, based on the weight of the components, to give the lamination resin.

The initial viscosity of the resultant polyurethane lamination resin is about 300 mPas at 25° C. and its pot life is about 350 seconds, with a reaction time of about 20 seconds. About 340 seconds of the pot life can be used as lamination time here. Table 1 states the mechanical properties of the hardened lamination resin.

COMPARATIVE EXAMPLE 1

Based on US 2005/0244653

Manufacture of Polyol Component (A)

A polyol component was produced by mixing of 96.3 kg of a polyether polyol based on sucrose/diethylene glycol/propylene oxide/ethylene oxide, molecular weight 620 (functionality 4.5), 100 g of 1-methylimidazole, 80 g of 1,8-diazabicyclo[5,4,0]-7-undecene in thermoactivatable form, 1 kg of diethyltolylenediamine, 2 kg of a sodium aluminosilicate having zeolite structure, and 300 g of silicone antifoam (Antifoam MSA, DOW Corning).

The viscosity of the resultant polyol component is 3300 mPas at 25° C.

Manufacture of Isocyanate Component (B):

An isocyanate mixture was produced from 30 kg of a polyphenylene polymethylene polyisocyanate (Lupranat® M20) and 70 kg of a modified MDI (Lupranat® MP102). The viscosity of the resultant isocyanate component is 570 mPas at 25° C.

Processing to Give the Lamination Resin:

The components described above are processed in a machine in an A:B mixing ratio of 100:115, based on the weight of the components, to give the lamination resin.

The initial viscosity of the resultant polyurethane lamination resin is about 1300 mPas at 25° C. and its pot life is about 200 seconds, with a reaction time of about 70 seconds. About 125 seconds of the pot life can be used as lamination time here. Table 1 states the mechanical properties of the hardened lamination resin.

TABLE 1

System comparisons (mechanical properties):

| | Inventive example 1 | Comparative example 1 |
|---|---|---|
| Hardness [°Shore D] | 84 | 83 |
| Tensile strength [N/mm$^2$] | 61.4 | 56.5 |
| Tensile strain at break[%] | 5 | 2 |

INVENTIVE EXAMPLE 2

A cut-to-size "Pentax" glass mat from Saertex was placed in a mold of internal height 2 mm that can be closed by using a hinged lid. The lamination resin according to Inventive example 1 was introduced, the amount being such as to fill the mold completely after saturation of the glassfiber mat. The laminate is then cured at 80° C. Table 2 states the mechanical properties of the cured material.

COMPARATIVE EXAMPLE 2

A cut-to-size "Pentax" glass mat from Saertex was placed in a mold of internal height 2 mm that can be closed by using a hinged lid. The lamination resin according to Comparative example 1 was introduced, the amount being such as to fill the mold completely after saturation of the glassfiber mat. The laminate is then cured at 80° C. Table 2 states the mechanical properties of the cured material.

TABLE 2

Comparison of the laminates - test direction longitudinal with respect to the fiber

| Property | Test standard | Inventive example 2 | Comparative example 2 |
|---|---|---|---|
| Density | DIN EN ISO 845 | 1491 kg/m$^3$ | 1456 kg/m$^3$ |
| Glass content | DIN EN ISO 1172 | 43% | 43% |
| Hardness | DIN 53505 | 84°Shore D | 83°Shore D |
| Flexural strength | DIN EN ISO 178 | 379 N/mm$^2$ | 161 N/mm$^2$ |
| Flexural modulus of elasticity | DIN EN ISO 178 | 5472 N/mm$^2$ | 2463 N/mm$^2$ |
| Tensile strength | DIN EN ISO 527 | 191 N/mm$^2$ | 149 N/mm$^2$ |
| Tensile modulus of elasticity | DIN EN ISO 527 | 15702 N/mm$^2$ | 6016 N/mm$^2$ |

The invention claimed is:

1. A process for producing a polyurethane lamination resin, comprising: mixing
   a) an isocyanate prepolymer comprised of diphenylmethane diisocyanate in reacted form and a difunctional polyether in reacted form,
   b) a polyphenylene polymethylene polyisocyanate,
   c) a trifunctional polyetherol having an average molar mass of from 350 to 600 g/mol,
   d) a thermoactivatable capped catalyst,
   e) optionally, at least one of a chain extender and a crosslinking agent,
   f) 0.5 to 5 parts by weight of an aluminosilicate water-absorber, relative to the total weight of components c), d), and f), and, if present, e) and g), and
   g) optionally, other additives
   and reacting components a), b), c) and optionally e) in the presence of component d) to make a polyurethane lamination resin.

2. The process according to claim 1, wherein a polyol component A), comprising components c), d), and, optionally, e), f), and g), is mixed with a polyisocyanate component B), comprising components a) and b), to give the polyurethane lamination resin.

3. The process according to claim 1, wherein the thermoactivatable capped catalyst d) comprises phenol-capped 1,8-diazabicyclo[5.4.0]undec-7-ene.

4. The process according to claim 3, wherein 1,8-diazabicyclo[5.4.0]undec-7-ene has been capped with phenol in a molar ratio from 0.9:1 to 1.1:1.

5. The process according to claim 1, wherein the crosslinking agent e) comprises glycerol in a proportion by weight of from 1 to 5% by weight, based on the total weight of components c), d), and f), and, if present, e) and g).

6. The process according to claim 1, wherein the NCO content of the isocyanate prepolymer a) is from 19 to 31% by weight.

7. The process according to claim 1, wherein the isocyanate prepolymer a) is obtained by the reaction of monomeric diphenylmethane 4,4'-diisocyanate and polypropylene glycol with a molar mass of from 350 to 600 g/mol.

8. The process according to claim 1, wherein the ratio by weight of a) isocyanate prepolymer and b) polyphenylene polymethylene polyisocyanate is from 0.9:1 to 1.5:1.

9. The process according to claim 1, wherein the isocyanate index is from 85 to 145.

10. The process according to claim 1, wherein said polyurethane lamination resin has a viscosity of less than 1,000 mPa·s at room temperature one minute after production of said resin.

11. The process according to claim 1, wherein said polyurethane lamination resin has a viscosity of less than 500 mPa·s at room temperature one minute after production of said resin.

12. The process according to claim 1, wherein said aluminosilicate comprises at least one member selected from the group consisting of a sodium aluminosilicate, a potassium aluminosilicate, a calcium aluminosilicate, a cesium aluminosilicate, a barium aluminosilicate, a magnesium aluminosilicate, a strontium aluminosilicate, a sodium aluminophosphate, a potassium aluminophosphate, and a calcium aluminophosphate.

13. The process according to claim 1, wherein said aluminosilicate comprises a mixture of a sodium aluminosilicate, a potassium aluminosilicate, and a calcium aluminosilicate, said mixture being present in castor oil.

14. The process according to claim 1, wherein said aluminosilicate has a number-average particle size of not greater than 200 μm.

15. The process according to claim 1, wherein said aluminosilicate has a number-average particle size of not greater than 150 μm.

16. The process according to claim 1, wherein said aluminosilicate has a number-average particle size of not greater than 100 μm.

17. The process according to claim 1, wherein said polyphenylene polymethylene polyisocyanate comprises from 36 to 50% by weight of a 2-ring compound, from 20 to 28% by weight of a 3-ring compound, from 6 to 14% by weight of a 4-ring compound, from 2 to 8% by weight of a 5-ring compound, and from 12 to 28% by weight of a compound having 6 or more rings.

18. The process according to claim 1, wherein said trifunctional polyetherol c) has an average molar mass of from 420 to 600 g/mol.

19. A polyurethane lamination resin obtained via a process according to claim 1.

20. A laminate comprising a polyurethane lamination resin according to claim 19.

21. A ski or snowboard, comprising a laminate according to claim 20.

* * * * *